June 30, 1953     H. STORBAKKEN     2,643,824
POCKET CALCULATOR
Filed Aug. 7, 1952
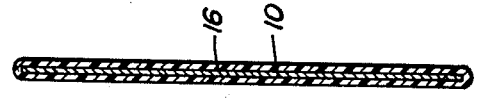
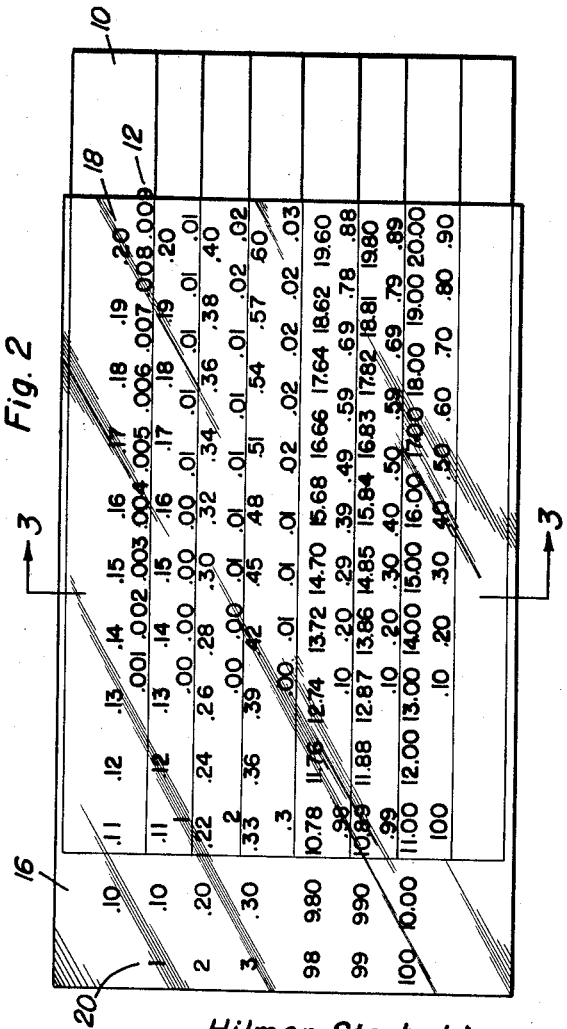
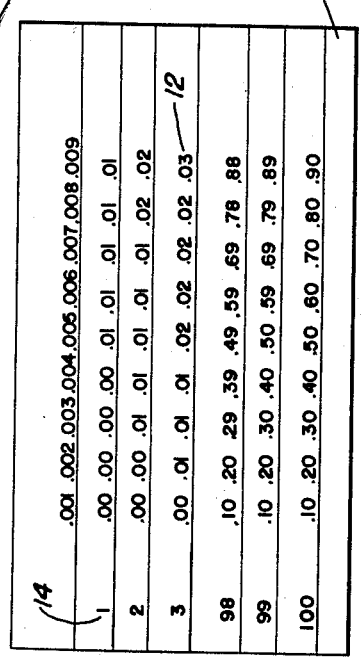
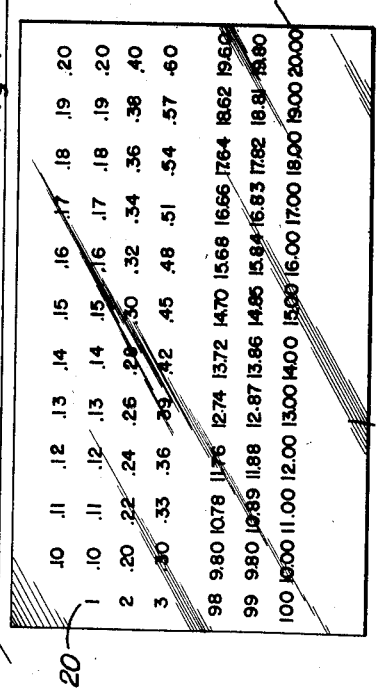
Hilmer Storbakken
INVENTOR.

Patented June 30, 1953

2,643,824

UNITED STATES PATENT OFFICE 2,643,824

POCKET CALCULATOR

Hilmer Storbakken, Viroqua, Wis.

Application August 7, 1952, Serial No. 303,133

3 Claims. (Cl. 235—89)

This invention relates to new and useful improvements in calculating devices and the primary object of the present invention is to provide a device for determining the total cost of a given number of units at a given price per unit without the necessity of having to multiply the number of units by the cost per unit.

Another important object of the present invention is to provide a pocket-type cost determining chart composed of two slidably engaged indicia bearing sheets having correlated rows of numbers thereon so that when the sheets are moved relative to each other to arrange a number of one sheet under a number on the other sheet that will total the cost per unit, an additional number on one sheet may be added to an additional number on the other sheet to indicate the cost of a given number of units.

A further object of the present invention is to provide a cost determining device that is extremely small and compact in structure whereby the same may be carried in the user's pocket in a convenient manner.

A still further aim of the present invention is to provide a cost determining device that is simple and practical in construction, neat and attractive in appearance, light in weight, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a group plan view showing the two members forming the instant invention;

Figure 2 is a plan view, in slightly larger scale than Figure 1, and showing the indicia bearing sheet disposed within its covering; and, Figure 3 is a transverse vertical sectional view taken substantially on the plane of section line 3—3 of Figure 2.

Referring now to the drawings in detail, wherein for the purpose of illustration, there is disclosed a preferred embodiment of the present invention, the numeral 10 represents a substantially rectangular sheet of white opaque plastic having spaced parallel longitudinally extending rows 12 of numbers thereon that will indicate the cost per unit of any number of units from one to one hundred units at any price from one-tenth of a cent to nine-tenths of a cent. A transverse column of number 14 containing the numbers from one to one hundred, inclusive is provided on the inside sheet 10 at one end thereof.

Since the device is primarily intended to be employed for determining the prices of gasoline and fuel oil, the top row of numbers on the sheet 10 will contain the numbers from one-tenth of a cent through nine-tenths of a cent in percentages.

The sheet 10 is slidable within a transparent, substantially rectangular, open ended, plastic covering 16 which has spaced parallel longitudinally extending rows of figures or numbers 18 thereon containing the amounts for from one through one hundred units at from ten cents through twenty cents per unit. The top row or line of numbers on the covering contains the numbers from ten cents through twenty cents inclusive in percentage.

A transverse row of numbers 20 is provided at the left end of the covering 16 and contains the numbers from one to one hundred.

The rows of numbers on the sheet 10 alternate with the rows of numbers on the covering 16 so that a number on the covering may be readily added to a number on the sheet therebeneath in a manner to be presently described.

In order to determine the cost of ninety-eight units at fifteen and three-tenths cents per unit, the inside sheet 10 is moved within the covering 16 until the three thousandth number (.003) in the top row of numbers on sheet 10 is directly under the number fifteen hundredths (.15) in the top row of numbers on the covering, as these two numbers added together indicate the cost per unit of the product which in this example is .153.

Then the user will follow the column of numbers at the left end of the covering downwardly to the number of the units which in this case is ninety-eight. The row in which ninety-eight is disposed is followed to the right to the column in which the added numbers .15 and .003 are located and the number "14.70" is found on the covering at this point. The number ".29" is located on the sheet 10 directly under the number "14.70" on this covering and is added to the latter number to give the total $14.99 and hence the total cost of the ninety-eight units at 15.3 cents per unit.

Although the drawings fail to illustrate the units between 3 and 98 units and the cost per unit, it is to be understood that these units will be provided on the covering and the inside sheet. In the event it is necessary to determine the cost of units more than one hundred, for example one hundred forty-three, the cost of one hundred units is first determined and the cost of forty-three units is determined after which these two values are added together.

It will be noted that through this particular price determining device, it is not necessary for the user to multiply numbers in order to determine the total cost of a given number of units at a given cost. Once the price per unit has been determined and the sheet 10 slid within the covering 16 to establish this cost per unit, then the user merely follows the unit indicating column 20 to the price indicating column and adds the two figures.

Obviously, in the event that larger sales are anticipated, the unit values ranging from one to one hundred may be changed to include units in fives, tens or hundreds although the same principle will be followed in determining the cost of a given number of units.

Having described the invention, what is claimed as new is:

1. A pocket calculator comprising a base sheet card having parallel rows of numbers thereon, said numbers representing the product for a given number of units per tenths of a cent per unit, and a transparent covering slidable over the base sheet and also having parallel rows of numbers thereon, the numbers on the covering representing the product for the same number of units at whole cents per unit, the rows of numbers on the base sheet alternating with the rows of numbers on the covering, whereby a number on the covering may be added to a number on the base directly therebeneath.

2. A pocket calculator comprising a base sheet having spaced parallel rows of numbers thereon, the numbers in each row being progressively increased from left to right and indicating the cost per unit between one and one hundred units at any price from one-tenth cent through nine-tenths cent, a transparent covering for the base sheet having spaced parallel rows of numbers thereon alternating with the rows of numbers on the base sheet, the numbers on the covering containing the amounts for from one through one-hundred units at ten cents through twenty cents per unit, said base sheet being moved relative to the covering until a number on the base sheet added to a number thereabove on the covering indicates the cost per unit, then the number of units is followed on the covering to the right to a number on the covering under the added numbers, the said number on the covering under the added numbers is then added to a number on the base sheet directly thereunder to determine the cost of the number of units.

3. A pocket calculator comprising a transparent covering and an inside sheet slidably received in the covering, said covering being open at its ends to permit the sheet to extend from a selected end of the covering, said inside sheet having rows of figures thereon for any amount from one to one hundred units at any price from one tenth of a cent to nine tenths of a cent per unit, said covering having rows of figures thereon alternating with the rows of the sheet and containing the amounts for from one to one hundred units at from ten cents through twenty cents per unit, the rows of figures on the sheet including a top row having figures in tenths from one tenth to nine tenths and the rows of figures on the covering having figures from ten to twenty, said sheet being moved within said covering until a figure on the sheet added to a figure directly thereabove on the covering indicates the cost per unit, then a figure on the covering under the added figures and in the row on the covering representing the number of units is added to a figure on the sheet directly therebeneath to determine the cost of the given number of units.

HILMER STORBAKKEN.

No references cited.